(12) United States Patent
Schwarz et al.

(10) Patent No.: US 9,222,392 B2
(45) Date of Patent: Dec. 29, 2015

(54) EXHAUST GAS TREATMENT DEVICE

(75) Inventors: Roland Schwarz, Esslingen (DE); Johannes Grupp, Donzdorf (DE); Marco Wenz, Esslingen (DE)

(73) Assignee: Eberspaecher Exhaust Technology GmbH & Co. KG, Neunkirchen (DE)

( * ) Notice: Subject to any disclaimer, the term of this patent is extended or adjusted under 35 U.S.C. 154(b) by 573 days.

(21) Appl. No.: 13/087,097

(22) Filed: Apr. 14, 2011

(65) Prior Publication Data

US 2011/0252776 A1   Oct. 20, 2011

(30) Foreign Application Priority Data

Apr. 15, 2010   (DE) .......................... 10 2010 015 271

(51) Int. Cl.
*B01D 50/00*   (2006.01)
*F01N 3/28*   (2006.01)
*F01N 13/14*   (2010.01)

(52) U.S. Cl.
CPC ............ *F01N 3/2867* (2013.01); *F01N 3/2875* (2013.01); *F01N 13/14* (2013.01); *F01N 2260/10* (2013.01); *F01N 2350/04* (2013.01); *F01N 2350/06* (2013.01)

(58) Field of Classification Search
CPC   F01N 2350/04; F01N 3/2867; F01N 2350/06
USPC .................... 422/177, 179, 180, 168
See application file for complete search history.

(56) References Cited

U.S. PATENT DOCUMENTS

| 3,898,802 | A | 8/1975 | Tadokoro et al. |
|---|---|---|---|
| 3,989,471 | A | 11/1976 | Nowak |
| 4,004,887 | A | 1/1977 | Stormont |
| 4,043,761 | A | 8/1977 | Gaysert et al. |
| 4,101,280 | A | 7/1978 | Frietzsche et al. |
| 4,108,276 | A | 8/1978 | Hall et al. |
| 4,115,071 | A | 9/1978 | Masuda et al. |
| 4,145,394 | A | 3/1979 | Abthoff et al. |

(Continued)

FOREIGN PATENT DOCUMENTS

| DE | 2 222 663 A1 | 12/1973 |
|---|---|---|
| DE | 2 307 215 A1 | 8/1974 |

(Continued)

OTHER PUBLICATIONS

U.S. Appl. No. 13/213,589, filed Aug. 19, 2011, Wieland et al.

*Primary Examiner* — Tom P Duong
(74) *Attorney, Agent, or Firm* — Reinhart Boerner Van Deuren P.C.

(57) ABSTRACT

The present invention relates to an exhaust gas treatment device for an exhaust system of a combustion engine, more preferably of a motor vehicle with a housing comprising a jacket and an outlet funnel, with at least one exhaust gas treatment element which is arranged in the jacket and which via a support ring is axially supported on the housing, wherein the outlet funnel comprises an outer funnel and an inner funnel.

A simplified design is obtained if the outer funnel at an inner end facing the jacket is connected to the jacket in a fixed manner and at an outer end facing away from the jacket is connected in a fixed manner to the inner funnel, and if between the inner funnel and the outer funnel an insulation space circumferentially running in circumferential direction is formed and the inner funnel at an inner end facing the jacket carries the support ring and relative to the outer funnel is at least axially loose.

15 Claims, 1 Drawing Sheet

(56) References Cited

U.S. PATENT DOCUMENTS

| | | |
|---|---|---|
| 4,155,980 A | 5/1979 | Santiago et al. |
| 4,188,783 A | 2/1980 | Sayo et al. |
| 4,344,922 A | 8/1982 | Santiago et al. |
| 4,353,873 A | 10/1982 | Noritake et al. |
| 4,601,168 A | 7/1986 | Harris |
| 4,730,454 A | 3/1988 | Pischinger et al. |
| 5,009,065 A | 4/1991 | Howe et al. |
| 5,016,438 A | 5/1991 | Harris |
| 5,082,479 A | 1/1992 | Miller |
| 5,186,906 A | 2/1993 | Kawakami et al. |
| 5,198,625 A | 3/1993 | Borla |
| 5,212,948 A | 5/1993 | Gillingham et al. |
| 5,358,287 A | 10/1994 | Winzen |
| 5,396,764 A | 3/1995 | Rao et al. |
| 5,408,828 A * | 4/1995 | Kreucher et al. ............... 60/299 |
| 5,426,269 A | 6/1995 | Wagner et al. |
| 5,555,621 A | 9/1996 | Tanabe et al. |
| 5,606,857 A | 3/1997 | Harada |
| 5,808,245 A | 9/1998 | Wiese et al. |
| 5,916,530 A | 6/1999 | Maus et al. |
| 6,128,821 A * | 10/2000 | Grescher ........................ 29/890 |
| 6,394,225 B1 | 5/2002 | Yasuda |
| 6,397,586 B1 | 6/2002 | Sakurai et al. |
| 6,543,575 B1 | 4/2003 | Marcellus |
| 6,635,227 B1 | 10/2003 | Shibata et al. |
| 6,729,127 B2 | 5/2004 | Woerner et al. |
| 6,837,336 B2 | 1/2005 | Gault et al. |
| 6,868,670 B1 | 3/2005 | Schellin |
| 6,935,461 B2 | 8/2005 | Marocco |
| 6,941,751 B2 | 9/2005 | Yamamoto et al. |
| 7,051,523 B2 | 5/2006 | Kerchner |
| 7,093,428 B2 | 8/2006 | LaBarge et al. |
| 7,127,884 B2 | 10/2006 | Wörner et al. |
| 7,334,402 B2 | 2/2008 | Hiraga |
| 7,462,332 B2 * | 12/2008 | Hardesty et al. ............... 422/179 |
| 7,662,204 B2 | 2/2010 | Forster et al. |
| 7,694,778 B2 | 4/2010 | Toyoshima et al. |
| 2003/0108457 A1 | 6/2003 | Gault et al. |
| 2004/0202591 A1 | 10/2004 | Jacob et al. |
| 2006/0053779 A1 | 3/2006 | Belisle et al. |
| 2006/0157296 A1 | 7/2006 | Belisle |
| 2006/0266022 A1 | 11/2006 | Woerner et al. |
| 2007/0011874 A1 | 1/2007 | Myers |
| 2007/0137184 A1 | 6/2007 | Patchett et al. |
| 2007/0144126 A1 | 6/2007 | Ohya et al. |
| 2009/0158721 A1 | 6/2009 | Wieland et al. |
| 2009/0208393 A1 | 8/2009 | Wenzel et al. |
| 2009/0241512 A1 | 10/2009 | Wirth |
| 2009/0266065 A1 | 10/2009 | Barrieu et al. |
| 2009/0272106 A1 | 11/2009 | Werni et al. |
| 2010/0061898 A1 | 3/2010 | Lehnen et al. |
| 2011/0203692 A1 | 8/2011 | Werni et al. |
| 2011/0256032 A1 | 10/2011 | Schwarz et al. |

FOREIGN PATENT DOCUMENTS

| | | |
|---|---|---|
| DE | 23 64 425 A1 | 7/1975 |
| DE | 24 07 263 A1 | 9/1975 |
| DE | 34 32 283 A1 | 3/1986 |
| DE | 92 05 294 U1 | 6/1992 |
| DE | 43 18 343 A1 | 12/1994 |
| DE | 44 46 986 A1 | 7/1995 |
| DE | 197 11 789 A1 | 10/1998 |
| DE | 19711789 A1 | 10/1998 |
| DE | 199 29 423 A1 | 1/2000 |
| DE | 199 59 955 A1 | 6/2000 |
| DE | 199 18 301 C1 | 10/2000 |
| DE | 100 21 494 A1 | 8/2001 |
| DE | 10020492 A1 | 10/2001 |
| DE | 101 05 841 A1 | 8/2002 |
| DE | 103 00 780 A1 | 7/2004 |
| DE | 10 2004 021 474 B3 | 3/2005 |
| DE | 103 34 307 A1 | 3/2005 |
| DE | 103 56 000 A1 | 7/2005 |
| DE | 103 60 726 A1 | 7/2005 |
| DE | 102004051512 A1 | 5/2006 |
| DE | 102005017947 A1 | 10/2006 |
| DE | 10 2005 025045 A1 | 12/2006 |
| DE | 10 2005 044494 B3 | 3/2007 |
| DE | 10 2007 010486 A1 | 9/2008 |
| DE | 10 2007 062 663 A1 | 6/2009 |
| DE | 10 2008 022081 A1 | 11/2009 |
| EP | 0 112 634 A1 | 7/1984 |
| EP | 0 176 722 A1 | 4/1986 |
| EP | 0 393 257 A1 | 10/1990 |
| EP | 0 420 521 A | 4/1991 |
| EP | 0 471 175 A1 | 2/1992 |
| EP | 0 537 603 A1 | 4/1993 |
| EP | 0 580 963 A1 | 2/1994 |
| EP | 0 724 070 A1 | 7/1996 |
| EP | 0 953 741 A1 | 11/1999 |
| EP | 1 149 992 A1 | 10/2001 |
| EP | 1 236 872 A1 | 9/2002 |
| EP | 1 329 608 A2 | 7/2003 |
| EP | 1 462 625 A1 | 9/2004 |
| EP | 1 536 113 A2 | 6/2005 |
| EP | 1 653 059 A1 | 5/2006 |
| EP | 1 715 154 A2 | 10/2006 |
| FR | 2 617 536 A1 | 1/1989 |
| FR | 2 821 117 A1 | 8/2002 |
| FR | 2 877 038 A1 | 4/2006 |
| JP | 2002-070524 A | 3/2002 |
| WO | WO 2006/117468 A1 | 11/2006 |

* cited by examiner

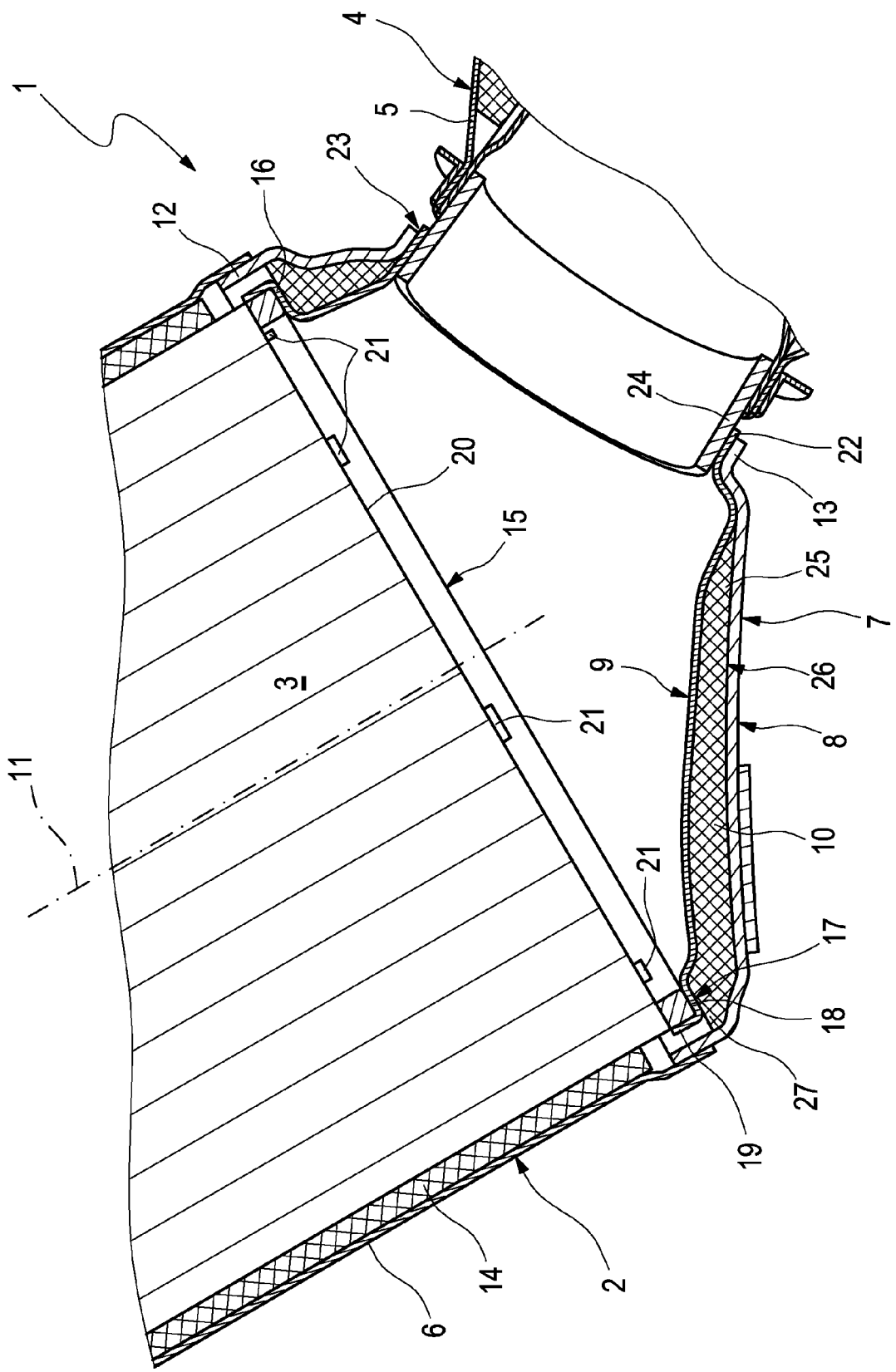

EXHAUST GAS TREATMENT DEVICE

CROSS-REFERENCE TO RELATED PATENT APPLICATIONS

This patent application claims the benefit of German Patent Application No. 10 2010 015271.4, filed Apr. 15, 2010, the entire teachings and disclosure of which are incorporated herein by reference thereto.

FIELD OF THE INVENTION

The present invention relates to a latent heat storage device and an exhaust gas treatment device for an exhaust system of a combustion engine, more preferably of a motor vehicle.

BACKGROUND OF THE INVENTION

Usually an exhaust gas treatment device, which for example is a catalytic converter or a particle filter, comprises a housing and at least one exhaust gas treatment element, such as for example a catalytic converter element or a particle filter element arranged therein. With usual design the housing has a jacket and an outlet funnel, while an inlet funnel can usually be present as well. The respective exhaust gas treatment element as a rule is arranged in the jacket of the housing with a bearing mat which envelopes the exhaust gas treatment element in the circumferential direction and axially supported on the housing via a support ring.

To reduce the thermal loading of an environment of the exhaust gas treatment device it is possible in principle to equip the outlet funnel with an air gap insulation, for the purpose of which the outlet funnel at least in certain regions is of a double wall design. For this purpose, the outlet funnel can comprise an outer funnel and an inner funnel between which an insulation space is formed.

Problematic with such an exhaust gas treatment device are the thermal expansion effects that occur in operation, which result in relative movements and thus in mechanical stresses of the component parts concerned. For example, the inner funnel in operation heats up faster than the outer funnel. In addition, the inner funnel can reach higher temperatures than the outer funnel. This results in a different heat expansion between outer funnel and inner funnel.

SUMMARY OF THE INVENTION

The present invention deals with the problem of stating an improved embodiment for an exhaust gas treatment device of the type mentioned at the outset, which is more preferably characterized in that thermally-induced stresses within the exhaust gas treatment device, preferentially in the region of the outlet funnel, are reduced. In addition, a thermal insulation that is improved, preferentially improved with respect to the fatigue durability, is to be realisable in the region of the outer funnel.

According to the invention, this problem is solved through the subject of the independent claim. Advantageous embodiments are the subject of the dependent claims.

The invention is based on the general idea of connecting the outlet funnel to the jacket only via the outer funnel, to connect the inner funnel to the outer funnel in a fixed manner only in the region of an outer end distant from the jacket and to support the support ring only on the inner funnel. As a result of this, the inner funnel is loose relative to the outer funnel in the region of the insulation space and in the region of its inner end facing the jacket, that is moveable at least in the axial direction. Thermally-induced stresses between inner funnel and outer funnel can be substantially reduced as a result. At the same time, supporting the exhaust gas treatment element on the inner funnel via the support ring brings about a substantial simplification of the design since additional holding devices, which for example can be supported on the jacket, can be omitted. On the one hand, this reduces the manufacturing expenditure and on the other hand the assembly expenditure.

According to an advantageous embodiment the inner end of the inner funnel can be formed as integral holder for the support ring. As a result of this the axially supporting effect or the support function of the inner funnel for the exhaust gas treatment element can be improved.

For example, the holder can have an annular disc shaped support bottom, on which the support ring supports itself and which stands away from the inner funnel radially to the outside. As a result of this a flat, sturdy support for the support ring can be created which allows absorbing comparatively large axial supporting forces.

In addition or alternatively the holder can have a ring-shaped holding collar on which the support ring supports itself radially outside and which stands away from the inner funnel axially to the inside, that is in the direction of the jacket or exhaust gas treatment element. As a result of this, a radial fixing or positioning for the support ring on the holder and thus on the inner funnel can be realised. Practically, said holding collar can be formed on the support bottom so that the inner funnel at its inner end initially merges into the support bottom and following this into the holding collar.

According to another advantageous embodiment the inner end of the inner funnel can be radially spaced from the inner end of the outer funnel, namely more preferably along the entire circumference. As a result of this it is ensured that the inner funnel at least in the region of the inner end can also expand in radial direction relative to the outer funnel without generating mechanical stresses in the process.

According to another advantageous embodiment the two outer ends of the funnels can be fastened to each other through a welded connection. Here, a circumferential weld seam on the face end is preferred.

Optionally, the two outer ends of the funnels can be fastened to a sleeve which is coaxially arranged to the outer ends of the funnels. Such a sleeve on the one hand results in a stabilisation of the outer ends of the funnels and on the other hand makes possible a simple integration of the exhaust gas treatment device in the exhaust system. Via this sleeve, the exhaust gas treatment device can for example be connected to an exhaust pipe or to another component of the exhaust system.

According to an advantageous further configuration the two outer ends of the funnel can be fastened to the sleeve through a welded connection, wherein it can be optionally provided that this welded connection is formed as circumferential weld seam which connects the two outer ends of the funnels at the face end to the outside or to the inside of the sleeve. Here, a so-called three-sheet seam is realised, which interconnects three separate parts through a single welding operation.

According to a particularly advantageous embodiment a thermally insulating insulation material can be arranged in the insulation space running circumferentially in circumferential direction radially formed between inner funnel and outer funnel. As a result of this, the thermal insulation in the outlet funnel can be substantially improved. Of special interest in this context is the fact that the support ring supported on the inner funnel simultaneously realises a seal between exhaust path and insulation space, so that exhaust gas cannot enter the insulation space. More preferably, a disadvantageous exposure of the insulation material to hot exhaust gases can be avoided as a result.

For example, damaging of the insulation material and a discharge of the insulation material from the insulation space can be reduced or avoided as a result. Practically, the support ring is arranged on the exhaust gas treatment element in the region of an outer cross section axially on a face end of the exhaust gas treatment element. More preferably, the support ring is positioned on the exhaust gas treatment element so that exhaust gas from the exhaust gas treatment element can only exit in a region located radially within the support ring. In other words, the support ring is radially positioned on the axial face end of the exhaust gas treatment element on the outlet side so far outside that no exit region located radially outside the support ring materializes.

According to an alternative embodiment an insulation body, which supports itself radially outside on the outer funnel and radially inside on the inner funnel and which consists of a thermally insulating insulation material can be arranged in the insulation space. Such an insulation body comprises a specific shape that is matched to the shape of the insulation space and because of this has particularly favourable characteristics with regard to the contact forces, supporting effect and insulation effects that can be achieved.

Further important features and advantages of the invention are obtained from the subclaims, from the drawing and from the associated figure description by means of the drawing.

It is to be understood that the features mentioned above and still to be explained in the following cannot only be used in the respective combination stated, but also in other combinations or by themselves without leaving the scope of the present invention.

BRIEF DESCRIPTION OF THE DRAWINGS

Preferred exemplary embodiments of the invention are shown in the drawing and are explained in more detail in the following description.

The only FIG. 1 shows a slightly perspective representation of an exhaust gas treatment device in longitudinal section in the region of an outlet funnel.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

According to FIG. 1, an exhaust gas treatment device 1 shown only partially here comprises a housing 2 and at least one exhaust gas treatment element 3 that is arranged in the housing 2. The exhaust gas treatment device 1 is suitable for use in an exhaust system 4 of a combustion engine, which more preferably can be located in a motor vehicle. Only a component part 5 of the exhaust system 4, to which the exhaust gas treatment device 1 is connected, is shown here.

The housing 2 comprises a jacket 6 and an outlet funnel 7. Usually, the housing 2 can also comprise an inlet funnel. The outlet funnel 7 comprises an outer funnel 8 and an inner funnel 9. Inner funnel 9 and outer funnel 8 with regard to their dimensions are matched to each other such that between inner funnel 9 and outer funnel 8 an insulation space 10 is formed, which runs circumferentially closed in circumferential direction. The circumferential direction in this case refers to a longitudinal centre axis 11 of the housing 2 or of the exhaust gas treatment device 1. The longitudinal centre axis 11 in this case defines the axial direction or longitudinal direction of the exhaust gas treatment device 1 or of the housing 2 as well as of the exhaust gas treatment element 3.

The outer funnel 8 at an inner end 12 facing the jacket 6 is connected to the jacket 6 in a fixed manner. In the shown example of FIG. 1 the outer funnel 8 is coaxially inserted into the jacket 6. Practically, the outer funnel 8 can be welded to the jacket 6. It is likewise possible to fit the outer funnel 8 onto the jacket 6 on the outside. In addition, an integral design wherein jacket 6 and outer funnel 8 are produced of a sheet metal part through forming, for example through deep-drawing, is also conceivable. However, preferred is the design shown here, wherein jacket 6 and outer funnel 8 form separate components, while the outer funnel 8 is inserted into the jacket 6.

The outer funnel 8 is additionally connected to the inner funnel 9 in a fixed manner at an outer end 13 facing away from the jacket 6.

The exhaust gas treatment element 3 can for example be a particle filter element. It can likewise be a catalytic converter element. Accordingly, the exhaust gas treatment device 1 is practically a particle filter device or a catalytic converter device or a combination thereof.

The exhaust gas treatment element 3 is enveloped by a bearing mat 14 in circumferential direction and together with this bearing mat 14 arranged in the jacket 6. The exhaust gas treatment element 3 because of this is radially supported on the jacket 6 via the bearing mat 14. The radial direction in this case refers to the longitudinal centre axis 11. Axially, the exhaust gas treatment element 3 is supported on the outlet funnel 7 via a support ring 15. With the exhaust gas treatment device 1 introduced here, the support ring 15 is supported on an inner end 16 of the inner funnel 9 facing the jacket 6, that is not on the outer funnel 8. Thus the inner funnel 9 carries the support ring 15 on its inner end 16. In addition it is provided that the inner funnel 9 in the region of its inner end 16 is loose relative to the outer funnel 8 at least in the axial direction. In other words, inner funnel 9 and outer funnel 8 are not fastened to each other in the region of their inner ends 12, 16 at least in the axial direction, but moveable relative to each other. Accordingly, this applies also to the region of the insulation space 10, in which the two funnels 8, 9 do not touch each other.

Preferred is the configuration shown here wherein the inner end 16 of the inner funnel 9 is radially spaced from the inner end 12 of the outer funnel 8, namely more preferably along the entire circumference. As a result of this, inner funnel 9 and outer funnel 8 are also radially loose or not fastened to each other or moveable relative to each other in the region of their inner ends 12, 16. With this embodiment the inner funnel 9 is thus arranged on the outer funnel 8 in a manner freely standing to the inside.

The inner end 16 of the inner funnel 9 in this case is formed as integral holder 17 for the support ring 15. In other words, the holder 17 provided for receiving the support ring 15 is integrally formed on the inner funnel 9. Said holder 17 in this case comprises an annular disc shaped support bottom 18. On this support bottom 18, the support ring 15 is axially supported. This support bottom 18 radially stands away from the inner funnel 9 to the outside. It is practically located in a support bottom plane extending perpendicularly to the longitudinal centre axis 11. In addition it is provided that the holder 17 additionally comprises a ring-shaped holding collar 19. On this holding collar 19, the support ring 15 can support itself radially outside. To this end, the holding collar 19 stands away from the inner funnel 9 axially to the inside, that is in the direction of the exhaust gas treatment element 3. Insofar as the holder 17, as here, comprises both a support bottom 18 as well as a holding collar 19, the holding collar 19 is practically formed on the support bottom 18. Accordingly, the inner funnel 9 in the region of its inner end 16 integrally merges initially into the support bottom 18 and following this into the holding collar 19.

The support ring 15 is practically positioned as far as possible radially outside on an axial face end 20 of the exhaust gas treatment element 3 on the outlet side facing the outlet funnel 7. As a result it can be prevented that exhaust gas, radially outside the support ring 15, axially exits the exhaust gas treatment element 3. More preferably, the support ring 15 finishes flush radially outside with an outer circumference or with an outside of the exhaust gas treatment element 3; likewise, the support ring 15 can radially protrude over the outer cross section of the exhaust gas treatment element 3.

In the shown example the support ring 15 can be equipped with several radial passage openings 21 through which for example a pressure equalisation between the exhaust path and the regions, in which the bearing mat 14 and the insulation space 10 are arranged, is possible. These passage openings 21 are practically provided on the support ring 15 on the face end facing the exhaust gas treatment element 3.

The outer end 13 of the outer funnel 8 can be connected in a fixed manner with an outer end 22 of the inner funnel 9 facing away from the jacket 6 by means of a welded connection. The respective welded connection, which in FIG. 1 is indicated by an arrow 23, can be practically designed as circumferential weld seam at the face end. In the example, a fixed connection between the two outer ends 13, 22 of the two funnels 8, 9 with a sleeve 24 is created with the help of this circumferential weld seam, which sleeve is coaxially arranged to the two outlet-sided or outer ends 13, 22 of the two funnels 8, 9. This welded connection 23 in this case can connect the two outer ends 13, 22 of the funnels 8, 9 on the face end to the outside of the sleeve 24, provided the sleeve 24 is inserted in the inner funnel 9 as in the example of FIG. 2. The weld seam 23 can then be simply applied from the outside. In principle, however, the sleeve 24 can also be fitted to the outside of the outer funnel 8, as a result of which the weld seam 23 would then have to be applied to the inside of the sleeve 24. Practically, however, the weld seam 23 is embodied as three-sheet-seam, which interconnects in a fixed manner the three components, namely the two funnels 8, 9 and the sleeve 24 with a single welding operation.

With the embodiment shown in FIG. 1 a thermally insulating insulation material 25 is arranged in the insulation space 10. This insulation material 25 in this case can be used in the form of an insulation mat, which in principle can have a similar construction as the bearing mat 14. Alternatively, the insulation material 25 can also be realised in the form of an insulation body 26, which is a shaped body of insulation material 25 and which radially supports itself on the outside on the outer funnel 8 and radially on the inside on the inner funnel 9. Through a shaping of the insulation body 26 complementarily to the outer funnel 8 and to the inner funnel 9 a stabilisation for the inner funnel 9 is produced, since it can be effectively supported on the outer funnel 8 via the insulation body 26. As a result, it is more preferably possible to realise the inner funnel 9 with a smaller wall thickness than the outer funnel 8. For example, the wall thickness of the inner funnel 9 is approximately half the size of the wall thickness of the outer funnel 8.

The insulation body 26 shown here can be formed at an inner end 27 facing the jacket 6 so that there it axially supports the inner funnel 9 in the region of the support ring 15. For example, the inner end 27 of the insulation body 26 to this end can be provided with an annular disc shaped axial face end, which axially supports the inner end 16 of the inner funnel 9 in the region of the holder 17, more preferably in the region of the support bottom 18. As a result of this, a flat and thus effective support of the inner funnel 9 in the region of the holder 17 is obtained, as a result of which the axial support forces, which axially position the exhaust gas treatment element 3 in the housing 2, can be transmitted via the support ring 15 to the inner funnel 9 and via the insulation body 26 or via the insulation material 25, to the outer funnel 8. Here, the insulation body 26 supports the inner funnel on an outside facing the outer funnel 8.

The support ring 15 can for example be produced of a knitted wire mesh. The bearing mat 14 can be produced of a usual bearing material. The exhaust gas treatment element 3 can be produced of metal. Preferred however is a ceramic exhaust gas treatment element 3. More preferably, the exhaust gas treatment element 3 can be a monolith, preferentially a ceramic monolith.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An exhaust gas treatment device for an exhaust system of a combustion engine, more preferably of a motor vehicle, comprising:
   with a housing comprising a jacket and an outlet funnel,
   with at least one exhaust gas treatment element arranged in the jacket and which is axially supported on the housing via a support ring,
   wherein the outlet funnel comprises an outer funnel and a one-piece inner funnel,
   wherein the outer funnel is connected to the jacket at an inner end facing the jacket in a fixed manner and at an outer end facing away from the jacket is connected to the inner funnel in a fixed manner,
   wherein between the inner funnel and the outer funnel an insulation space running circumferentially in circumferential direction is formed,
   wherein the inner funnel at an inner end facing the jacket carries the support ring and relative to the outer funnel is at least axially loose.

2. The exhaust gas treatment device according to claim 1, wherein
   the inner end of the inner funnel is formed as integral holder for the support ring.

3. The exhaust gas treatment device according to claim 2, wherein
   the holder comprises an annular disc shaped support bottom on which the support ring supports itself axially and which stands away from the inner funnel radially to the outside.

4. The exhaust gas treatment device according to claim 2, wherein
   the holder comprises a ring-shaped holding collar on which the support ring supports itself radially outside and which stands away from the inner funnel axially to the inside.

5. The exhaust gas treatment device according to claim 2, wherein
   the holding collar is formed on the support bottom.

6. The exhaust gas treatment device according to claim 1, wherein
   the inner end of the inner funnel is radially spaced from the inner end of the outer funnel.

7. The exhaust gas treatment device according to claim 1, wherein
   the inner end of the inner funnel is radially spaced from the inner end of the outer funnel closed along the circumference.

8. The exhaust gas treatment device according to claim 1, wherein
   the two outer ends of the funnels are fastened to each other through a welded connection.

9. The exhaust gas treatment device according to claim 8, wherein
   the welded connection is configured as circumferential weld seam at the face end.

10. The exhaust gas treatment device according to claim 1, wherein
    the two outer ends of the funnels are fastened to a sleeve arranged coaxially thereto.

11. The exhaust gas treatment device according to claim 10, wherein
    the two outer ends of the funnels are fastened to the sleeve through a welded connection.

12. The exhaust gas treatment device according to claim 11, wherein
    the welded connection is configured as circumferential weld seam which connects the two outer ends of the funnels to the outside or to the inside of the sleeve at the face end.

13. The exhaust gas treatment device according to claim 1, wherein
    in the insulation space a thermally insulating insulation material is arranged.

14. The exhaust gas treatment device according to claim 1, wherein
    in the insulation space an insulation body is arranged, which radially supports itself on the outside on the outer funnel and radially on the inside on the inner funnel and which consists of a thermally insulating insulation material.

15. The exhaust gas treatment device according to claim 14, wherein
    the insulation body axially supports the inner funnel in the region of the support ring at an inner end facing the jacket.

* * * * *